Patented Dec. 15, 1925.

1,565,777

UNITED STATES PATENT OFFICE.

DAVIDE BERTOLINI, OF LOCARNO, SWITZERLAND, ASSIGNOR TO SWISS JEWEL COMPANY, S. A., OF LOCARNO, SWITZERLAND.

SYNTHETICALLY-MADE PRECIOUS STONE AND METHOD OF PRODUCING THE SAME.

No Drawing. Application filed January 20, 1925. Serial No. 3,683.

*To all whom it may concern:*

Be it known that I, DAVIDE BERTOLINI, a citizen of Switzerland, residing at Locarno, Switzerland, have invented certain new and useful Improvements in Synthetically-Made Precious Stones and Methods of Producing the Same, of which the following is a specification.

My invention relates to synthetically made precious stones and its object is to provide, synthetically, stones having the color and appearance of the aquamarine found in nature and hardness equal to that of the sapphire found in nature.

Various gems such as rubies and sapphires have been produced synthetically but, so far as I am aware, no method of producing stones having the appearance of acquamarines and the hardness of sapphires was known prior to my invention.

The apparatus employed in the production of synthetic sapphires or rubies is well adapted for use in the production of synthetic acquamarines, and consists essentially in a blow pipe producing an oxy-hydrogen flame. Such apparatus is described and illustrated in Letters Patent of the United States, No. 988,230, granted Auguste Victor Louis Verneuil, March 28, 1911.

The ingredients used in producing a synthetic stone having the before mentioned properties are alumina and oxides of magnesium, cobalt and vanadium, and the proportions used are approximately 86% of alumina and 14% of oxide of magnesium with a trace of oxide of cobalt and of oxide of vanadium.

These ingredients are powdered and mixed then allowed to fall, through the flame of the blow pipe, onto a support of fire clay or other refractory material where they will be fused and form the artificial stone.

In starting the process, the oxygen is fed in small quantity so that the flame is relatively cold. The powder then falling onto the fire clay support is not fused but is merely baked or fritted and gradually forms a cone. As the cone increases in height, the flame acts directly upon its point which, being of very small mass, is fused, the ingredients pass, at the moment of fusion, from the powdered state to a crystalline state and produce a stalk of crystalline formation. The proportion of oxygen in the flame is then gradually increased and the falling powder forms a bulb of gradually increasing size. When the desired size is reached the flame is shut off and the finished stone allowed to cool.

It is not essential that the metals should be reduced to oxides before being fed to the flame as the pure metals, or sulphates, carbonates, etc., of the same metals, would be reduced to oxides by the high temperature of the flame which, during the greater part of the process, should be maintained at about 1900° C. at which temperature only the oxides of these metals are stable. If the metals are to be fed in other than oxide state, they should be calcined for about an hour at a temperature of about 1000° C. and fed in quantities which would produce the required proportions of oxides. These proportions may be readily calculated by any one versed in metallurgy.

Having thus described my invention, what I claim as new and desire to secure by Letters Patent is:—

1. A process of producing precious stones having the hardness of the natural sapphire and the color and appearance of the natural aquamarine consisting in causing alumina, oxide of magnesium, oxide of cobalt and oxide of canadium to be fused together.

2. A process of producing precious stones having the hardness of the natural sapphire and the color and appearance of the natural acquamarine consisting in powdering alumina and oxides of magnesium, cobalt and vanadium, mixing the ingredients and gradually feeding them through an oxy-hydrogen flame.

3. A process of producing precious stones having the hardness of the natural sapphire and the color and appearance of the natural aquamarine consisting in powdering alumina and oxides of magnesium, cobalt and vanadium in the proportion of approximately 86% of alumina, 14% of oxide of magnesium and a trace each of oxide of cobalt and oxide of vanadium, mixing the ingredients and gradually feeding them through an oxy-hydrogen flame.

4. A synthetic stone having the hardness of a natural sapphire and the color and appearance of a natural aquamarine composed of alumina, and oxides of magnesium, cobalt and vanadium.

5. A synthetic stone having the hardness of a natural sapphire and the color and appearance of a natural aquamarine composed of alumina, and oxides of magnesium, cobalt and vanadium in the proportion of approximately 86% of alumina, 14% of oxide of magnesium and a trace each of oxide of cobalt and oxide of vanadium.

In testimony whereof I have signed my name to this specification.

BERTOLINI DAVIDE.